(12) United States Patent
Summers

(10) Patent No.: US 11,355,026 B2
(45) Date of Patent: Jun. 7, 2022

(54) MOUNTING PANEL FOR FLIGHT SIMULATOR INSTRUMENTS AND FLIGHT CONTROLS

(71) Applicant: Marvin Summers, Fort Lauderdale, FL (US)

(72) Inventor: Marvin Summers, Fort Lauderdale, FL (US)

( * ) Notice: Subject to any disclaimer, the term of this patent is extended or adjusted under 35 U.S.C. 154(b) by 102 days.

(21) Appl. No.: 16/780,895

(22) Filed: Feb. 3, 2020

(65) Prior Publication Data

US 2020/0251010 A1     Aug. 6, 2020

Related U.S. Application Data

(60) Provisional application No. 62/800,271, filed on Feb. 1, 2019.

(51) Int. Cl.
*G09B 9/08*     (2006.01)

(52) U.S. Cl.
CPC .................... *G09B 9/08* (2013.01)

(58) Field of Classification Search
CPC .................. G09B 9/08; G09B 9/16
See application file for complete search history.

(56) References Cited

U.S. PATENT DOCUMENTS

| | | | |
|---|---|---|---|
| 6,106,298 A | 8/2000 | Pollak | |
| D855,526 S | 8/2019 | Summers | |
| D863,164 S | 10/2019 | Summers | |
| D863,165 S | 10/2019 | Summers | |
| D863,166 S | 10/2019 | Summers | |
| 2003/0054323 A1 | 3/2003 | Skaggs | |

FOREIGN PATENT DOCUMENTS

WO     WO2014096358 A2     6/2014

OTHER PUBLICATIONS

XTOP Installation Manual, Jun. 5, 2011, retrieved from https://silo.tips/download/xtopinstallationmanual (Year: 2011).*
The FlightLine_Aug. 26, 2018, https://web.archive.org/web/20180826180645/https://flightvelocity.com/.

* cited by examiner

*Primary Examiner* — Eddy Saint-Vil

(57) ABSTRACT

A mounting panel for flight simulator instruments and flight controls features affordable panels that can install onto any flat edge, such as a desk or table. The mounting panel for flight simulator instruments and flight controls is an apparatus used to provide a foundation for the positioning and mounting of flight simulation tools, including various monitors, displays, controls, and more. The apparatus is also configured to mount easily to a table or surface for secure usage. The apparatus includes a mounting board and a plurality of table-attachment brackets. The mounting board serves as the primary foundational support structure for the avionics and mounting brackets. The plurality of table-attachment brackets is a set of rigid units capable of arranging the mounting board in an appropriate position. The arrangement of the mounting board and the plurality of table-attachment brackets allows for arrangement of avionics appropriately for use in flight simulation.

9 Claims, 6 Drawing Sheets

MOUNTING PANEL FOR FLIGHT SIMULATOR INSTRUMENTS AND FLIGHT CONTROLS

The current application claims a priority to the U.S. Provisional Patent application Ser. No. 62/800,271 filed on Feb. 1, 2019. The current application is filed on Feb. 3, 2020 while Feb. 1, 2020 was on a weekend.

FIELD OF THE INVENTION

The present invention relates to flight simulator platforms. More specifically, the mounting panel for flight simulator instruments and flight controls relates to a pedestal/platform/desk/table/motion table-mounted flight simulator platform that integrates corresponding flight simulator hardware and supported mobile devices.

BACKGROUND OF THE INVENTION

Thanks in large part due to advances in electronic processing power and computing technologies, learning and training to become a pilot has never been more accessible. In present times, individuals are always looking for flight simulator mounting panels that accurately and safely recreate the flight deck of a real airplane for a reasonable cost. However, conventional systems are oftentimes expensive and limited to a certain type of flight deck configuration. As new gauges and flight technology develop, the need for secure addition of such technologies to a simulated cockpit increases correspondingly. Additionally, there is a lack of a mounting means to secure a supported mobile device on to conventional systems. These supported mobile devices are defined as compact computers, tablets, smartphones, etc. that can run application software that is either the same as, or complementary to, the rest of the installed flight simulator hardware. Oftentimes, users will have to prop up/rig their mobile devices onto the simulation panel manually, providing a less-than-ideal setup that breaks user immersion and risks physical damage to the devices.

The present invention aims to solve these problems. The mounting panel for flight simulator instruments and flight controls features affordable panels that can install onto any flat edge, such as a desk or table. Additionally, the present invention caters to a variety of flight deck shapes, sizes, and configurations. The present invention provides out-of-the-box compatibility with current flight simulator hardware and includes ample mechanisms for enabling the addition of new technologies as they develop into standardized shapes and forms. The present invention may be made out of suitable materials such as, but are not limited to: acrylonitrile butadiene styrene (ABS), polyvinyl chloride (PVC), etc. The present invention is fabricated through any means, including, but not limited to, computer numerical control (CNC) machining manufacturing, injection molding, etc. Furthermore, the present invention features supported mounting media to integrate a supported mobile device onto the mounting panel.

DETAILED DESCRIPTION OF THE INVENTION

All illustrations of the drawings are for the purpose of describing selected versions of the present invention and are not intended to limit the scope of the present invention.

Figure 1:
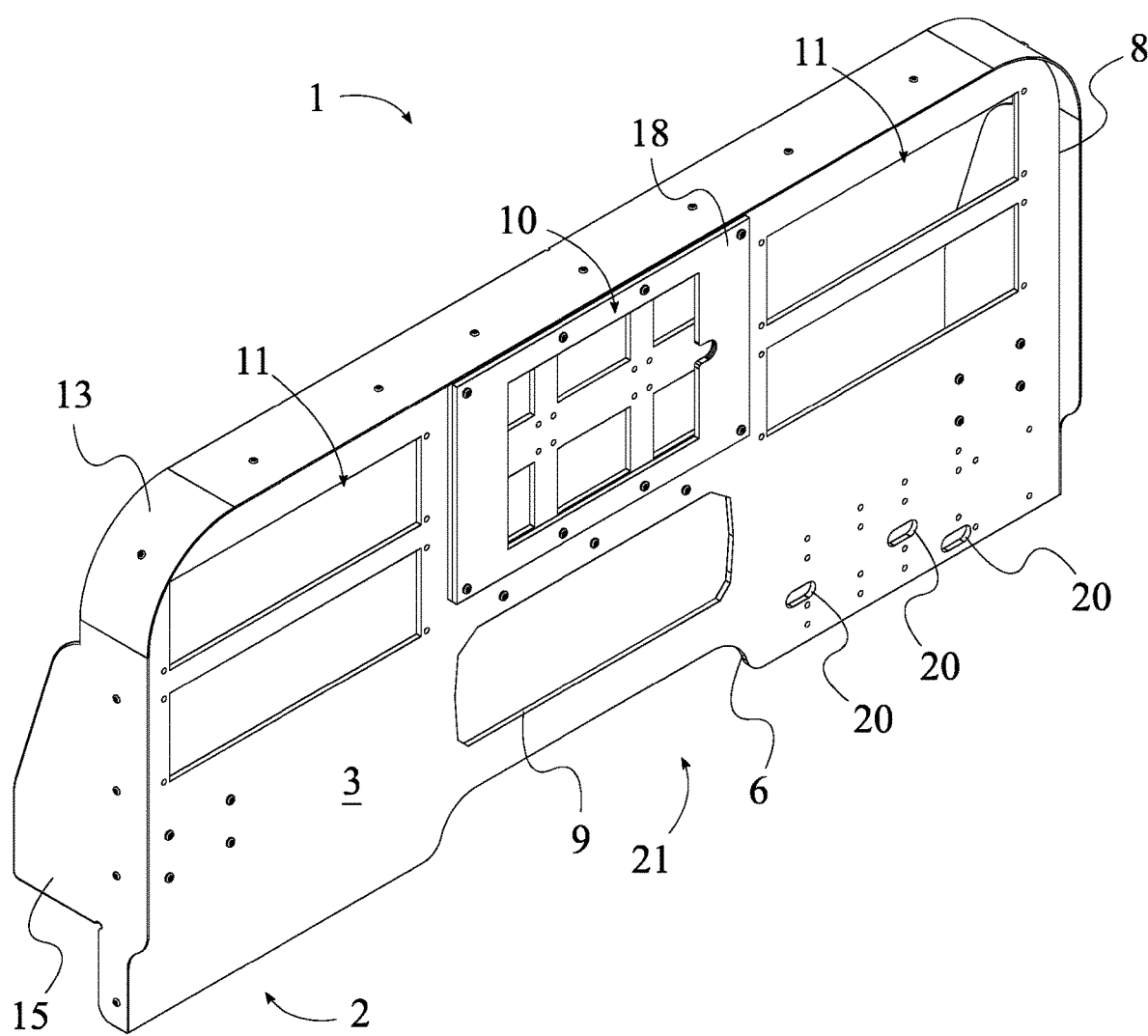
FIG. 1 is a front-top perspective view of the present invention.

The present invention is a mounting panel for flight simulator instruments and flight controls that is used to provide a foundation for the positioning and mounting of flight simulation tools, including various monitors, displays, controls, and more. The present invention is also configured to mount easily to a table or surface for secure usage. A preferred embodiment of the present invention comprises a mounting board 1 and a plurality of table-attachment brackets 12, as seen in FIG. 1. The mounting board 1 relates to a generally flat unit which serves as the primary foundational support structure for the avionics and mounting brackets. The plurality of table-attachment brackets 12 is a set of rigid units capable of arranging the mounting board 1 in an appropriate position.

Figure 2:
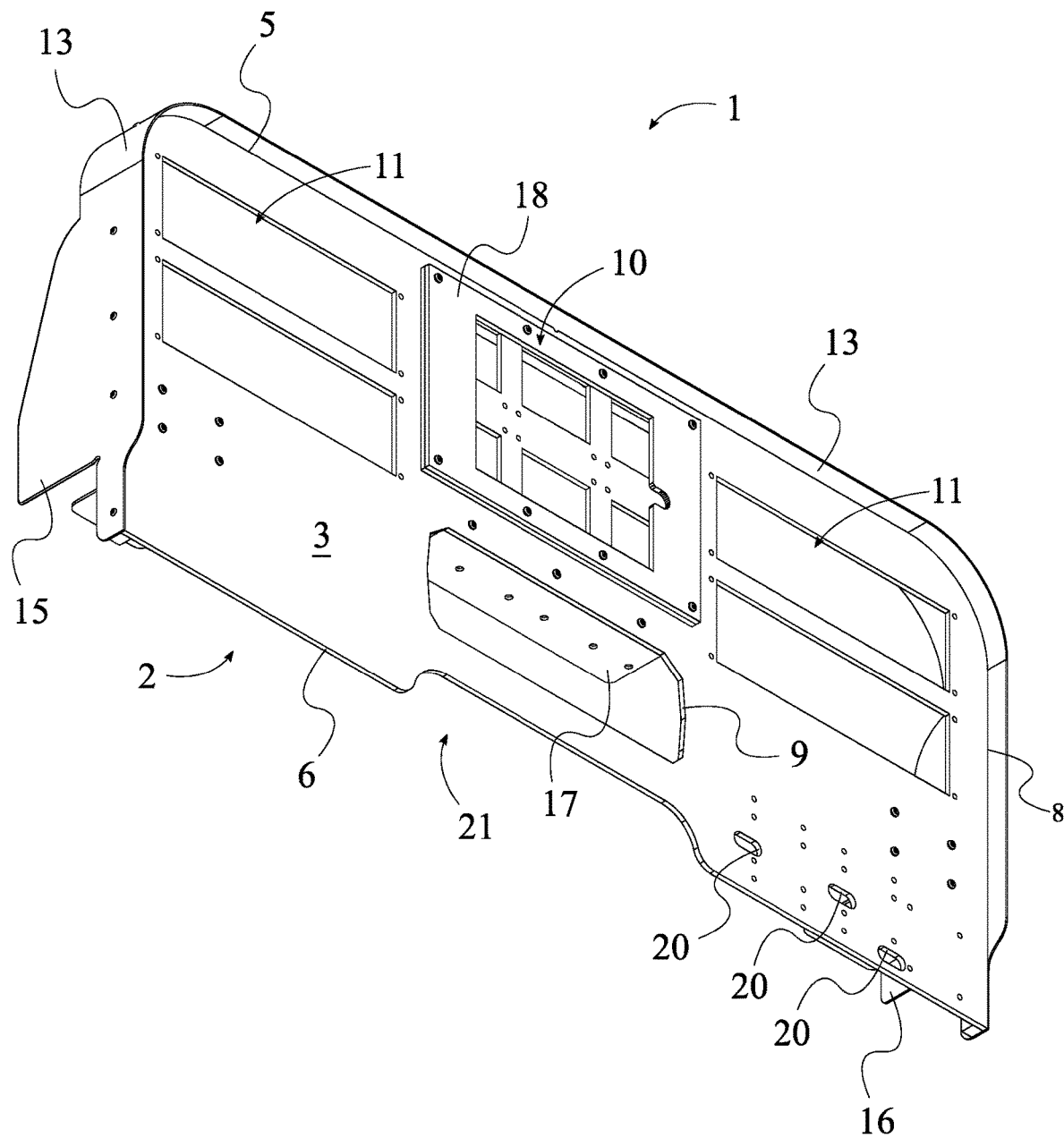
FIG. 2 is a front-bottom perspective view of the present invention.

The general configuration of the aforementioned components allows the present invention to efficiently and effectively arrange and support avionics for use by hobbyists and professional trainers alike. The mounting board 1 comprises a board body 2, a controller cutout 9, and at least one primary-display perforated portion 10, as seen in FIG. 2. The board body 2 relates generally to the volume occupied by the mounting board 1. The controller cutout 9 represents an opening in the mounting board 1 optimized for the mounting of a flight controller, especially any of a variety of steering wheels. The at least one primary-display perforated portion 10 is a set of panels connected to the mounting board 1 by a small amount of rigid material that severs easily. Such an arrangement enables the user to avoid creating a surplus of mounting openings that may remain unfilled upon completion of avionics mounting. Furthermore, the board body 2 comprises a front board face 3, a rear board face 4, a top lateral edge 5, a bottom lateral edge 6, a left lateral edge 7, and a right lateral edge 8. The front board face 3 is the surface of the board body 2 which preferably faces towards a user during use. Conversely, the rear board face 4 is the surface of the board body 2 which preferably faces away from a user. The top lateral edge 5 relates to the edge of the mounting board 1 which, in the preferred usage of the present invention, is furthest upwards away from the table or mounting surface. The bottom lateral edge 6 relates to the edge of the mounting board 1 which, in the preferred usage of the present invention, is closest to the table or mounting surface. The left lateral edge 7 relates to the edge of the mounting board 1 to the user's left, when the user faces the front board face 3. Conversely, the right lateral edge 8 relates to the edge of the mounting board 1 to the user's right, when the user faces the front board face 3.

Figure 5:
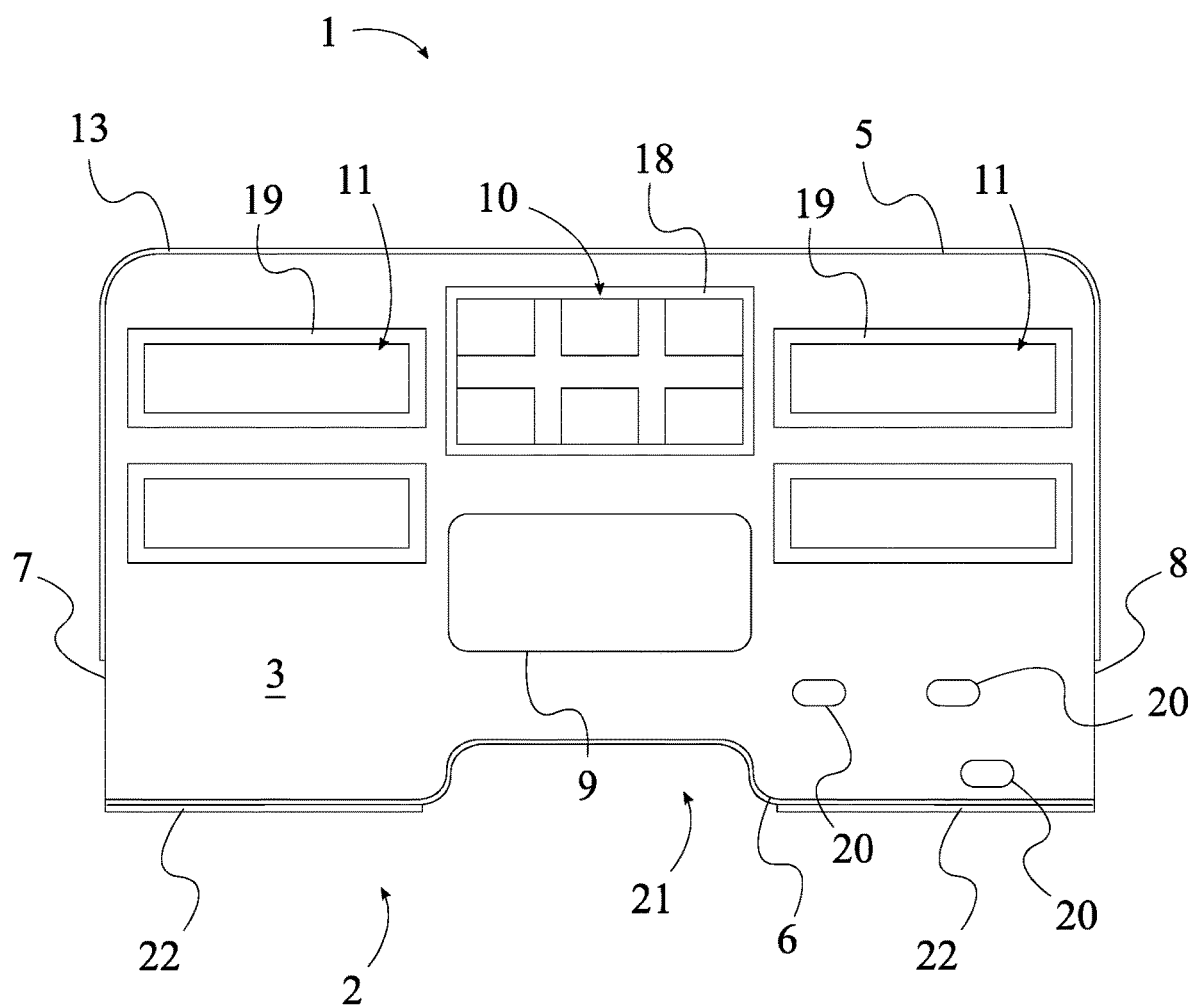
FIG. 5 is a schematic diagram representing a front view of the present invention.

The arrangement of the mounting board 1 and the plurality of table-attachment brackets 12 allows the present invention to appropriately arrange avionics for use. The controller cutout 9 traverses through the board body 2, as represented in FIG. 5. This arrangement provides an optimal mounting location for at least one controller of a flight simulator, particularly a flight yoke or other guiding mechanisms. The controller cutout 9 is positioned adjacent to the bottom lateral edge 6. Thus, the controller cutout 9 is positioned optimally for convenience of a user. The at least one primary-display perforated portion 10 is integrated into the board body 2. This arrangement allows the user to open necessary portions of the at least one primary-display perforated portion 10 in order to mount a variety of displays, gauges, readouts, and other such data providing tools that assist a pilot in flying safely and navigating various simulated flight conditions. The at least one primary-display perforated portion 10 is positioned offset from the bottom lateral edge 6. In this way, the at least one primary-display perforated portion 10 is optimally positioned for viewing components in relation to where they would be mounted in an actual cockpit. The plurality of table-attachment brackets 12 is mounted onto the rear board face 4. Thus, the mounting board 1 may connect to a table or other surface without interfering with the display shown to a user on the front board face 3. The plurality of table-attachment brackets 12 is positioned adjacent to the bottom lateral edge 6. This arrangement allows the mounting board 1 to be positioned in a comfortable position relative to the user. The plurality of table-attachment brackets 12 is distributed across the rear board face 4. Such an arrangement ensures stable mounting of the mounting board 1 across the table or surface used for support.

Figure 3:
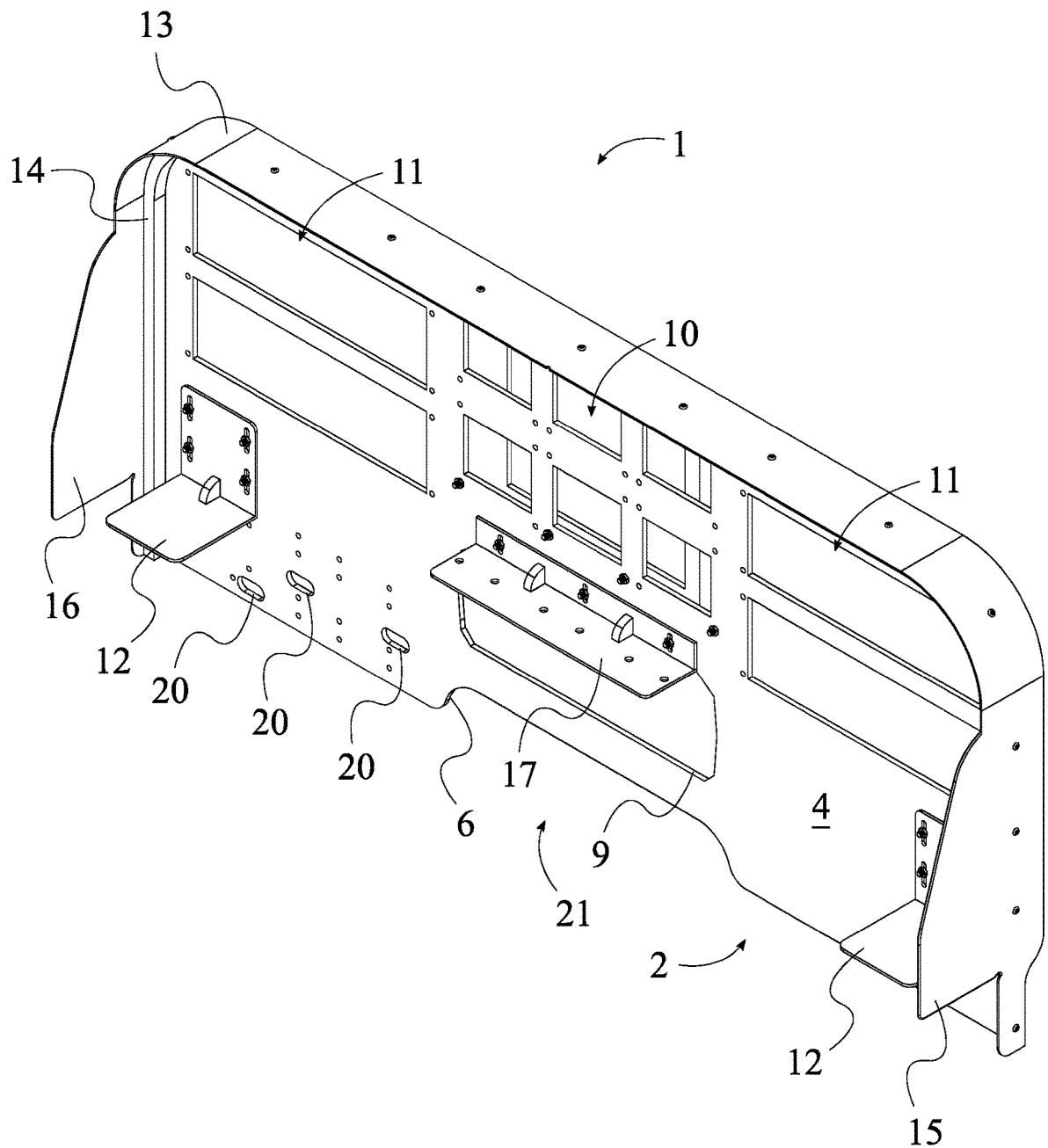
FIG. 3 is a rear-top view of the present invention.

The present invention further benefits from preventing external light from interfering with an otherwise immersive simulator experience. To achieve this, the present invention may further comprise a glare shield 13, as seen in FIG. 3. The glare shield 13 relates to a protective cover that prevents light from reflecting off the various monitors and displays connected to the mounting board 1. The glare shield 13 is laterally connected to the board body 2. This arrangement enables the glare shield 13 to extend to cover the front board face 3. The glare shield 13 is oriented away from the front board face 3. Thus, the glare shield 13 overhangs from the front board face 3 in order to prevent the front board face 3 from becoming affected by ambient light. The glare shield 13 traverses from the left lateral edge 7, along the top lateral edge 5, to the right lateral edge 8. In this way, the glare shield 13 prevents laterally directed light and overhead light from contacting the front board face 3.

Figure 4:
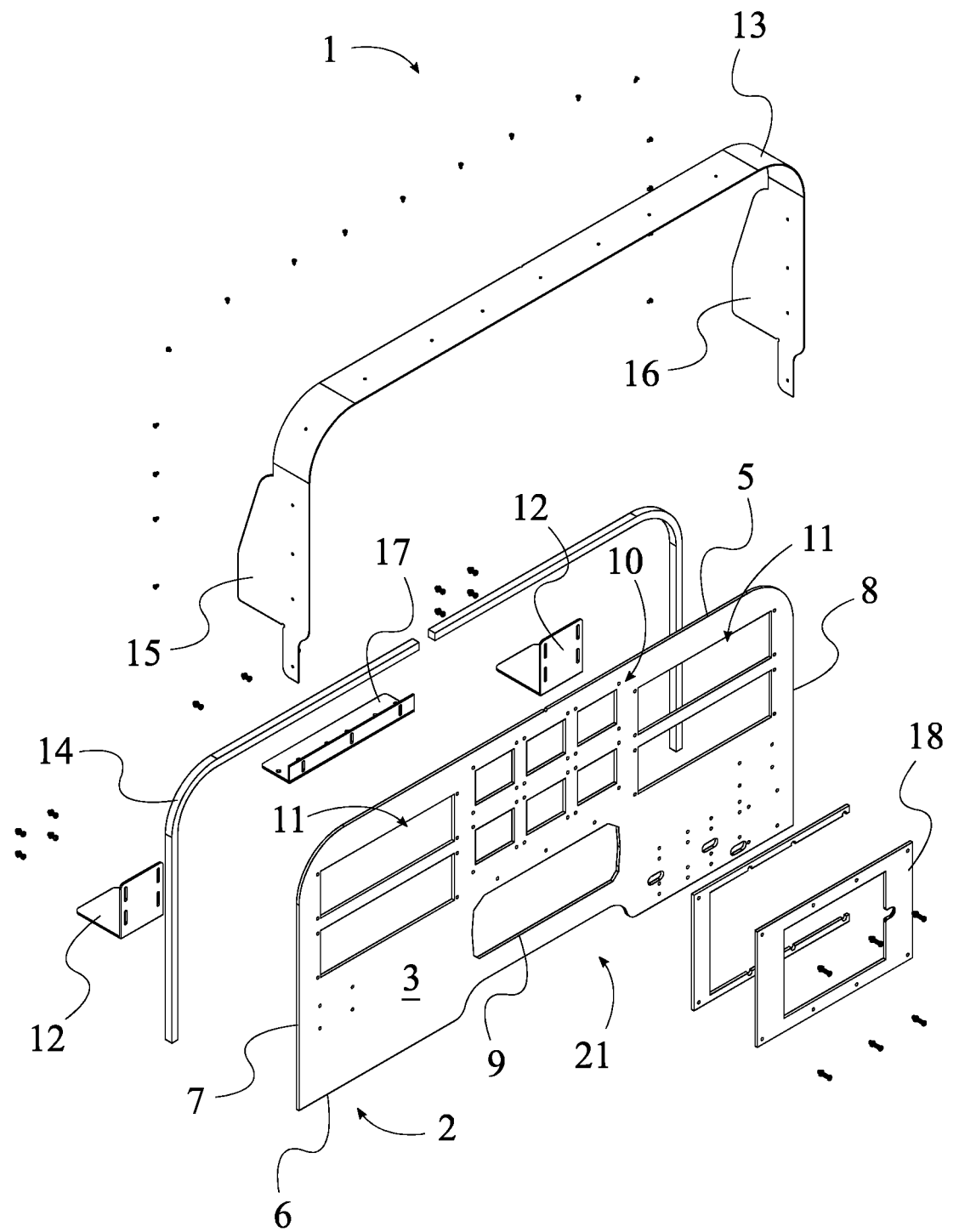
FIG. 4 is an exploded perspective view of the present invention.

The glare shield 13 may extend far enough away from the board body 2 that the glare shield 13 requires a connection mechanism that prevents potential dislodging or motion of the glare shield 13. To enable this, the present invention may further comprise a shield attachment mechanism 14, as seen in FIG. 4. The shield attachment mechanism 14 relates to a mount into which the glare shield 13 may connect to secure its position relative to the board body 2. The shield attachment mechanism 14 is laterally connected between the board body 2 and the glare shield 13. Such an arrangement enables the shield attachment mechanism 14 to utilize the stability of the mounting board 1 to arrange the glare shield 13. The shield attachment mechanism 14 traverses from the left lateral edge 7, along the top lateral edge 5, to the right lateral edge 8. Thus, the shield attachment mechanism 14 provides the glare shield 13 with support along the entirety of the relevant edges of the board body 2.

The mounting board 1 may be joined to surfaces beyond tables. To enable attachment to shelves and other items, the present invention may further comprise a first shelf mount 15 and a second shelf mount 16, as seen in FIG. 3. The first shelf mount 15 relates to a rigid connector, preferably a bracket, which functions with the second shelf mount 16 to enable the mounting board 1 to join to a shelf, rather than a table. Similarly, the second shelf mount 16 relates to a rigid connector, preferably a bracket, which functions with the first shelf mount 15 to enable the mounting board 1 to join to a shelf, rather than a table. The first shelf mount 15 and the second shelf mount 16 are laterally connected to the board body 2. This arrangement enables the first shelf mount 15 and the second shelf mount 16 to affect the position of the board body 2. The first shelf mount 15 is positioned along the left lateral edge 7. In this way, the first shelf mount 15 allows the user to support the left side of the mounting board 1. Furthermore, the second shelf mount 16 is positioned along the right lateral edge 8. Thus, the first shelf mount 15 and the second shelf mount 16 enable support of the mounting board 1 from either lateral edge of the mounting board 1.

The primary controls for a flight simulator are generally expensive and fragile, and thus often benefit from the use of additional mounting equipment to ensure stable connection to the mounting board 1. To accommodate for this, the present invention may further comprise at least one controller-supporting bracket 17, as seen in FIG. 3. The at least one controller-supporting bracket 17 relates to a set of rigid, preferably metal structural supports that enhance the ability of the present invention to support the primary controller of a flight simulator. The at least one controller-supporting bracket 17 is mounted onto the rear board face 4. This arrangement allows the at least one controller-supporting bracket 17 to function without contributing to the already-cluttered user view of the front board face 3. The at least one controller-supporting bracket 17 is peripherally positioned to the controller cutout 9. In this way, the at least one controller-supporting bracket 17 is arranged appropriately to allow for support of the primary controller of a flight simulator. The at least one controller-supporting bracket 17 is positioned in between the controller cutout 9 and the top lateral edge 5. Thus, the at least one controller-supporting bracket 17 allows the present invention to better support the steering wheel of a mounted flight simulator.

Many external displays, gauges, and the like have frames that are prone to damage or may visually distract the user during flight simulation. Further, many displays are manufactured at predetermined sizes that do not fit perfectly into a standardized mounting slot. To address this issue, the present invention may further comprise at least one primary frame adapter 18, as seen in FIG. 4. The at least one primary frame adapter 18 relates to a frame or border that enables secure attachment of displays that are too small for the at least one primary frame adapter 18, and protects primary display from damage due to physical contact, dust collection, or a variety of other mechanisms. The at least one primary frame adapter 18 is peripherally attached to the at least one primary-display perforated portion 10. This arrangement enables the at least one primary frame adapter 18 to securely mount and protect the periphery of the primary display connected to the mounting board 1.

The present invention often utilizes several valves, gauges, displays, and more in order to provide the user with as much information relevant navigational information as possible. To enable connection of these items, the mounting board 1 may further comprise a plurality of secondary-display perforated portions 11, as represented in FIG. 5. The plurality of secondary-display perforated portions 11 relates to a series of openings connected by a small amount of rigid material that severs easily, enabling the user to selectively create openings for different gauges and displays. The plurality of secondary-display perforated portions 11 is integrated into the board body 2. This arrangement allows items placed within the plurality of secondary-display perforated portions 11 to mount onto the board body 2. The plurality of secondary-display perforated portions 11 is positioned about the at least one primary-display perforated portion 10. Thus, the plurality of secondary-display perforated portions 11 prevents the addition of external displays and items from interfering with the user's view of the primary display.

The additional displays aside from the primary display could potentially suffer from damage due to exposure. Further, many displays for providing additional information are manufactured at predetermined sizes that do not fit perfectly into a standardized mounting slot. To reduce or prevent a variety of such damages, the present invention may further comprise at least one secondary frame adapter 19, as represented in FIG. 5. The at least one secondary frame adapter 19 relates to a protective frame that may be added around the plurality of secondary-display perforated portions 11 to ensure secure mounting of displays that do not fit snugly into the plurality of secondary-display perforated portions 11. The at least one secondary frame adapter 19 is peripherally attached to a selected portion from the plurality of secondary-display perforated portions 11. This arrangement enables secure mounting of displays of various sizes, and further prevents dust or physical stimuli like bumping from dislodging or damaging the items mounted in the plurality of secondary-display perforated portions 11.

The present invention further enables the addition of ancillary controls to supplement the steering wheel. To enable this functionality, the present invention may further comprise a plurality of controls cutouts 20, as shown in FIG. 1. The plurality of controls cutouts 20 relates to a set of openings that enable the secure addition of secondary controls, including, but not limited to, various levers, buttons, switches, actuators, and more, for responding to the various requirements provided by a given flight simulation. The plurality of controls cutouts 20 traverses through the board body 2. In this way, the plurality of controls cutouts 20 provides a stable mounting foundation for any desired secondary controls. The plurality of controls cutouts 20 is positioned about the controller cutout 9. Thus, the plurality of controls cutouts 20 is positioned appropriately for convenience of the user.

The present invention is made more intuitive through the application of suggested cutouts and comfort additions. To provide this need, the present invention may further comprise at least one leg-receiving groove 21, as represented in FIG. 5. The at least one leg-receiving groove 21 relates to a cut into the mounting board 1 that provides an intuitive mechanism for positioning the user relative to the other components of the present invention. The at least one leg-receiving groove 21 traverses through the board body 2. This arrangement ensures that the user's legs may be positioned appropriately for use of connected flight simulation technology. The at least one leg-receiving groove 21 is positioned adjacent to the bottom lateral edge 6. Thus, the at least one leg-receiving groove 21 is arranged to provide optimal leverage to the user.

Figure 6:
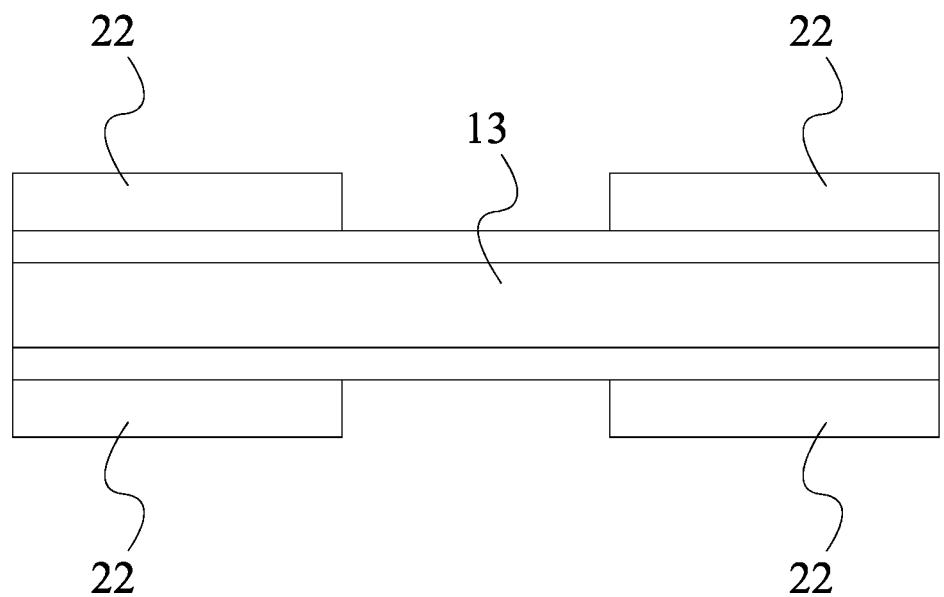
FIG. 6 is a schematic diagram representing a top view of the present invention.

The present invention may further provide a mechanism by which the mounting board 1 may be supported independently from a desk or table. To enable this ability, the present invention may further comprise a baseplate 22, as represented in FIG. 6. The baseplate 22 relates to a platform which enables the present invention to balance upon a table or other surface. The baseplate 22 is connected adjacent to the bottom lateral edge 6. Such an arrangement enables support of the mounting board 1 so as to balance the contents of the mounting board 1 safely upon a flat surface.

Although the invention has been explained in relation to its preferred embodiment, it is to be understood that many other possible modifications and variations can be made without departing from the spirit and scope of the invention as hereinafter claimed.

What is claimed is:

1. A mounting panel for flight simulator instruments and flight controls comprises:
   a mounting board;
   a plurality of table-attachment brackets;
   the mounting board comprises a board body, a controller cutout, and at least one primary-display perforated portion;
   the board body comprises a front board face, a rear board face, a top lateral edge, a bottom lateral edge, a left lateral edge, and a right lateral edge;
   the controller cutout traversing through the board body;
   the controller cutout being positioned adjacent to the bottom lateral edge;
   the at least one primary-display perforated portion being integrated into the board body;
   the at least one primary-display perforated portion being positioned offset from the bottom lateral edge;
   the plurality of table-attachment brackets being mounted onto the rear board face;
   the plurality of table-attachment brackets being positioned adjacent to the bottom lateral edge;
   the plurality of table-attachment brackets being distributed across the rear board face;
   a glare shield;
   the glare shield being laterally connected to the board body;
   the glare shield being oriented away from the front board face;
   the glare shield traversing from the left lateral edge, along the top lateral edge, to the right lateral edge;
   a shield attachment mechanism;
   the shield attachment mechanism being laterally connected between the board body and the glare shield;
   the shield attachment mechanism traversing from the left lateral edge, along the top lateral edge, to the right lateral edge;
   a first shelf mount;
   a second shelf mount;
   the first shelf mount and the second shelf mount being laterally connected to the board body;
   the first shelf mount being positioned along the left lateral edge;
   the second shelf mount being positioned along the right lateral edge;
   at least one controller-supporting bracket;
   the at least one controller-supporting bracket being mounted onto the rear board face;
   the at least one controller-supporting bracket being peripherally positioned to the controller cutout;
   the at least one controller-supporting bracket being positioned in between the controller cutout and the top lateral edge;
   at least one primary frame adaptor;
   the at least one primary frame adaptor being peripherally attached to the at least one primary-display perforated portion;
   at least one leg-receiving groove;
   the at least one leg-receiving groove traversing through the board body; and the at least one leg-receiving groove being positioned adjacent to the bottom lateral edge.

2. The mounting panel for flight simulator instruments and flight controls as claimed in claim 1 comprises:
the mounting board further comprises a plurality of secondary-display perforated portions;
the plurality of secondary-display perforated portions being integrated into the board body; and
the plurality of secondary-display perforated portions being positioned about the at least one primary-display perforated portion.

3. The mounting panel for flight simulator instruments and flight controls as claimed in claim 2 comprises:
at least one secondary frame adaptor; and
the at least one secondary frame adaptor being peripherally attached to a selected portion from the plurality of secondary-display perforated portions.

4. The mounting panel for flight simulator instruments and flight controls as claimed in claim 1 comprises:
a plurality of controls cutouts;
the plurality of controls cutouts traversing through the board body; and
the plurality of controls cutouts being positioned about the controller cutout.

5. The mounting panel for flight simulator instruments and flight controls as claimed in claim 1 comprises:
a baseplate; and
the baseplate being connected adjacent to the bottom lateral edge.

6. A mounting panel for flight simulator instruments and flight controls comprises:
a mounting board;
a plurality of table-attachment brackets;
a glare shield;
the mounting board comprises a board body, a controller cutout, at least one primary-display perforated portion, and a plurality of secondary-display perforated portions;
the board body comprises a front board face, a rear board face, a top lateral edge, a bottom lateral edge, a left lateral edge, and a right lateral edge;
the controller cutout traversing through the board body;
the controller cutout being positioned adjacent to the bottom lateral edge;
the at least one primary-display perforated portion being integrated into the board body;
the at least one primary-display perforated portion being positioned offset from the bottom lateral edge;
the plurality of table-attachment brackets being mounted onto the rear board face;
the plurality of table-attachment brackets being positioned adjacent to the bottom lateral edge;
the plurality of table-attachment brackets being distributed across the rear board face;
the glare shield being laterally connected to the board body;
the glare shield being oriented away from the front board face;
the glare shield traversing from the left lateral edge, along the top lateral edge, to the right lateral edge;
the plurality of secondary-display perforated portions being integrated into the board body;
the plurality of secondary-display perforated portions being positioned about the at least one primary-display perforated portion;
a first shelf mount;
a second shelf mount;
the first shelf mount and the second shelf mount being laterally connected to the board body;
the first shelf mount being positioned along the left lateral edge;
the second shelf mount being positioned along the right lateral edge;
at least one controller-supporting bracket;
the at least one controller-supporting bracket being mounted onto the rear board face;
the at least one controller-supporting bracket being peripherally positioned to the controller cutout;
the at least one controller-supporting bracket being positioned in between the controller cutout and the top lateral edge;
at least one primary frame adaptor;
the at least one primary frame adaptor being peripherally attached to the at least one primary-display perforated portion;
at least one secondary frame adaptor; and
the at least one secondary frame adaptor being peripherally attached to a selected portion from the plurality of secondary-display perforated portions;
at least one leg-receiving groove;
the at least one leg-receiving groove traversing through the board body; and
the at least one leg-receiving groove being positioned adjacent to the bottom lateral edge.

7. The mounting panel for flight simulator instruments and flight controls as claimed in claim 6 comprises:
a shield attachment mechanism;
the shield attachment mechanism being laterally connected between the board body and the glare shield; and
the shield attachment mechanism traversing from the left lateral edge, along the top lateral edge, to the right lateral edge.

8. The mounting panel for flight simulator instruments and flight controls as claimed in claim 6 comprises:
a plurality of controls cutouts;
the plurality of controls cutouts traversing through the board body; and
the plurality of controls cutouts being positioned about the controller cutout.

9. The mounting panel for flight simulator instruments and flight controls as claimed in claim 6 comprises:
a baseplate; and
the baseplate being connected adjacent to the bottom lateral edge.

* * * * *